(12) United States Patent
Welingkar et al.

(10) Patent No.: US 8,583,602 B2
(45) Date of Patent: Nov. 12, 2013

(54) RESTORING OF DATA TO MOBILE COMPUTING DEVICE

(75) Inventors: Bharat Welingkar, Los Altos, CA (US); Jiji Nair, Santa Clara, CA (US)

(73) Assignee: PALM, Inc., Sunnyvale, CA (US)

( * ) Notice: Subject to any disclaimer, the term of this patent is extended or adjusted under 35 U.S.C. 154(b) by 548 days.

(21) Appl. No.: 12/134,156

(22) Filed: Jun. 5, 2008

(65) Prior Publication Data

US 2009/0307333 A1    Dec. 10, 2009

(51) Int. Cl.
*G06F 7/00* (2006.01)

(52) U.S. Cl.
USPC ........... 707/654; 709/217; 709/218; 709/219; 707/640

(58) Field of Classification Search
USPC .................... 709/217, 218, 219; 707/654, 640
See application file for complete search history.

(56) References Cited

U.S. PATENT DOCUMENTS

| | | | |
|---|---|---|---|
| 5,392,390 A | 2/1995 | Crozier | |
| 5,710,922 A | 1/1998 | Alley et al. | |
| 5,727,202 A | 3/1998 | Kucala | |
| 6,324,544 B1 | 11/2001 | Alam et al. | |
| 6,434,683 B1 | 8/2002 | West et al. | |
| 6,549,917 B1 | 4/2003 | Pollard et al. | |
| 6,636,873 B1 | 10/2003 | Carini et al. | |
| 6,671,757 B1 | 12/2003 | Multer et al. | |
| 6,862,617 B1 | 3/2005 | Wu | |
| 6,868,451 B1 | 3/2005 | Peacock | |
| 6,975,854 B1 | 12/2005 | Kee | |
| 7,107,043 B2 | 9/2006 | Aoyama | |
| 7,516,357 B2 | 4/2009 | Shen et al. | |
| 2002/0083156 A1 | 6/2002 | Wysoczynski | |
| 2002/0131561 A1* | 9/2002 | Gifford et al. | 379/67.1 |
| 2004/0025058 A1* | 2/2004 | Kuriya et al. | 713/201 |
| 2005/0102329 A1* | 5/2005 | Jiang et al. | 707/204 |
| 2005/0131990 A1 | 6/2005 | Jewell | |
| 2005/0191998 A1 | 9/2005 | Onyon et al. | |
| 2007/0168721 A1* | 7/2007 | Luiro et al. | 714/15 |
| 2007/0197202 A1 | 8/2007 | Sprigg et al. | |
| 2008/0126444 A1* | 5/2008 | van Ingen et al. | 707/204 |
| 2008/0235299 A1 | 9/2008 | Haselton et al. | |
| 2008/0310633 A1* | 12/2008 | Brown et al. | 380/259 |
| 2009/0075630 A1* | 3/2009 | McLean | 455/411 |
| 2009/0163175 A1 | 6/2009 | Shi et al. | |
| 2009/0249005 A1 | 10/2009 | Bender et al. | |
| 2009/0300596 A1* | 12/2009 | Tyhurst et al. | 717/173 |

OTHER PUBLICATIONS

U.S. Appl. No. 12/134,154, filed Jun. 5, 2008, Welingkar et al.
U.S. Appl. No. 11/835,628, filed Aug. 8, 2007, Williams.
Block (data storage), Wikipedia, printed on Mar. 3, 2008 from Internet address: http://en.wikipedia.org/wiki/Block_%28data_storage%29, 1 page.

(Continued)

*Primary Examiner* — Harunur Rashid

(57) ABSTRACT

A mobile computing device comprises a wireless transceiver configured to communicate with a remote server, a memory; and a processing circuit. The processing circuit is configured in a restore operation to receive first data from the remote server, to receive a source indicator for second data from the remote server, wherein the first data and second data represent data previously stored in the memory of the mobile computing device or in a memory of another mobile computing device, and to send a request for the second data based on the source indicator using the wireless transceiver.

20 Claims, 9 Drawing Sheets

(56) References Cited

OTHER PUBLICATIONS

Synchronization, Wikipedia, printed on Mar. 3, 2008 from Internet address: http://en.wikipedia.org/wiki/Synchronization, 4 pages.
Amazon S3, Wikipedia, printed on Mar. 3, 2008 from Internet address: http://en.wikipedia.org/wiki/Amazon_S3, 4 pages.
Relational database, Wikipedia, printed on Mar. 3, 2008 from Internet address: http://en.wikipedia.org/wiki/Relational_database, 5 pages.
SQL, Wikipedia, printed on Mar. 3, 2008 from Internet address: http://en.wikipedia.org/wiki/SQL, 10 pages.
SyncML, Wikipedia, printed on Mar. 3, 2008 from Internet address: http://en.wikipedia.org/wiki/SyncML, 5 pages.
Computer file, Wikipedia, printed on Mar. 3, 2008 from Internet address: http://en.wikipedia.org/wiki/Computer_file, 6 pages.
Backup, Wikipedia, printed on Mar. 3, 2008 from Internet address: http://en.wikipedia.org/wiki/Backup, 12 pages.
System Restore, Wikipedia, printed on Mar. 13, 2008 from Internet address: http://en.wikipedia.org/wiki/System_restore, 1 page.
System Restore, Wikipedia, printed on Mar. 3, 2008 from Internet address: http://en.wikipedia.org/wiki/System_Restore, 3 pages.
Time Machine (Apple Software), Wikipediea, printed on Mar. 3, 2008 from Internet address: http://en.wikipedia.org/wiki/Time_Machine_%28Apple_software%29, 2 pages.
US Office Action for U.S. Appl. No. 11/712,228, mail date Jun. 18, 2009, 12 pages.
US Office Action for U.S. Appl. No. 11/712,228, mail date Dec. 11, 2009, 12 pages.
US Office Action for U.S. Appl. No. 12/134,154, mail date Mar. 29, 2010, 18 pages.
US Office Action for U.S. Appl. No. 11/712,228, mail date Apr. 13, 2010, 14 pages.
Office Action for U.S. Appl. No. 11/712,228, mail date Sep. 20, 2010, 14 pages.
Office Action for U.S. Appl. No. 12/134,154, mail date Sep. 29, 2010, 25 pages.

\* cited by examiner

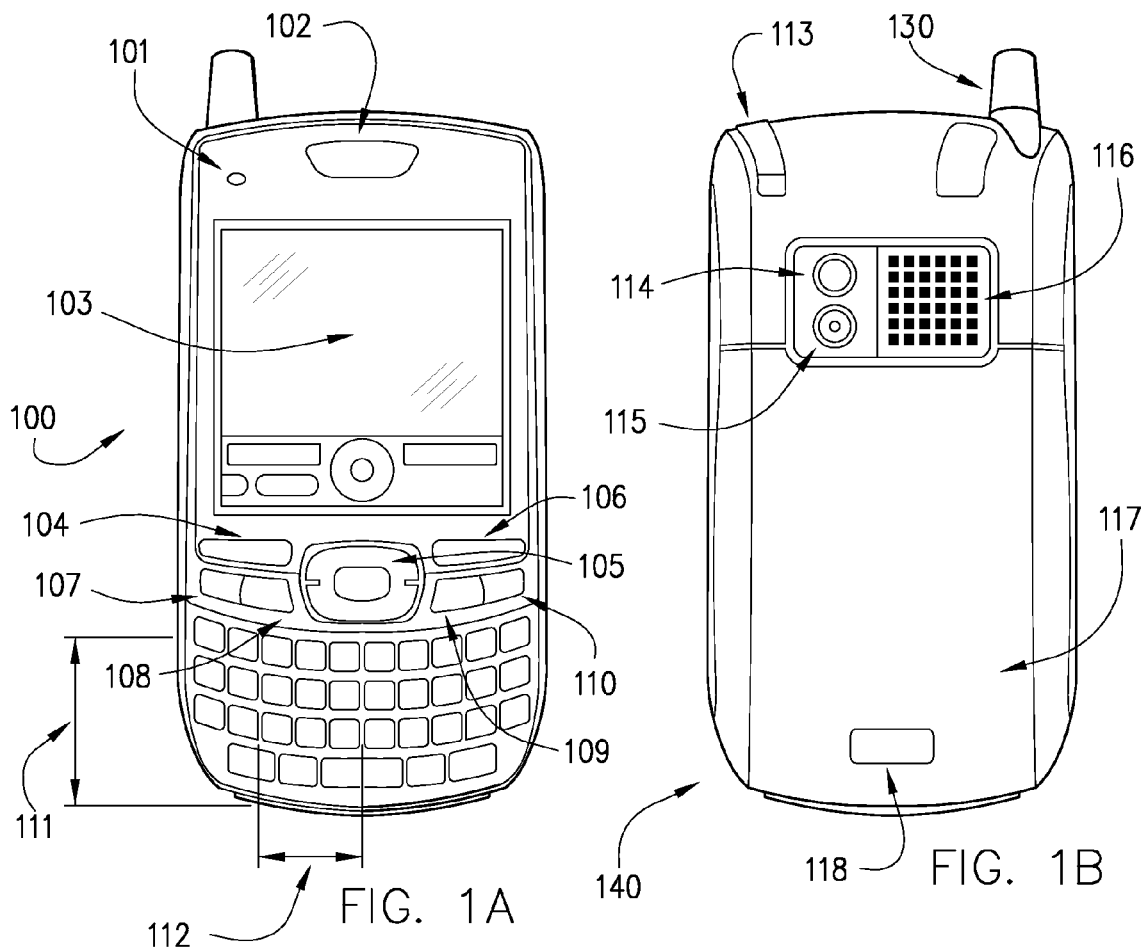
FIG. 1A
FIG. 1B
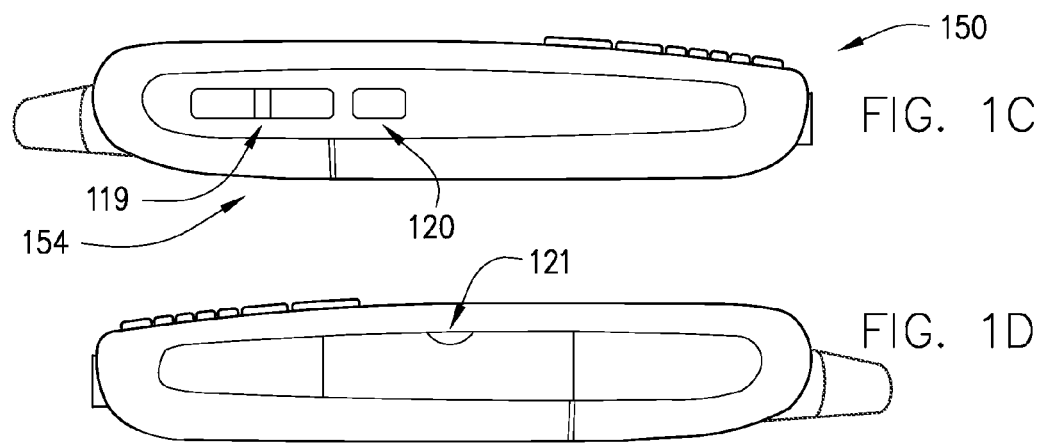
FIG. 1C
FIG. 1D
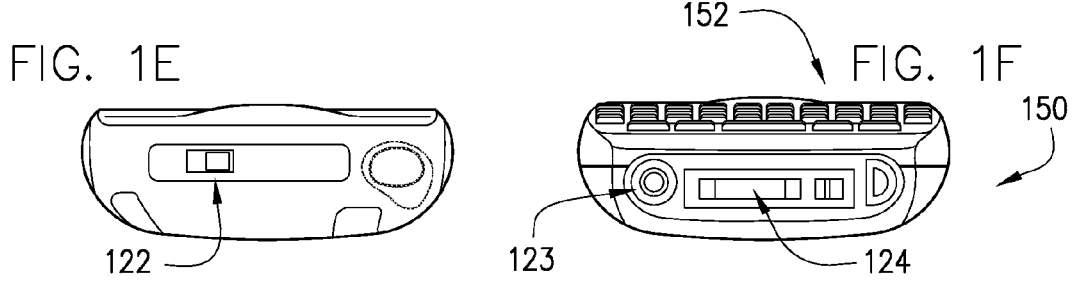
FIG. 1E
FIG. 1F

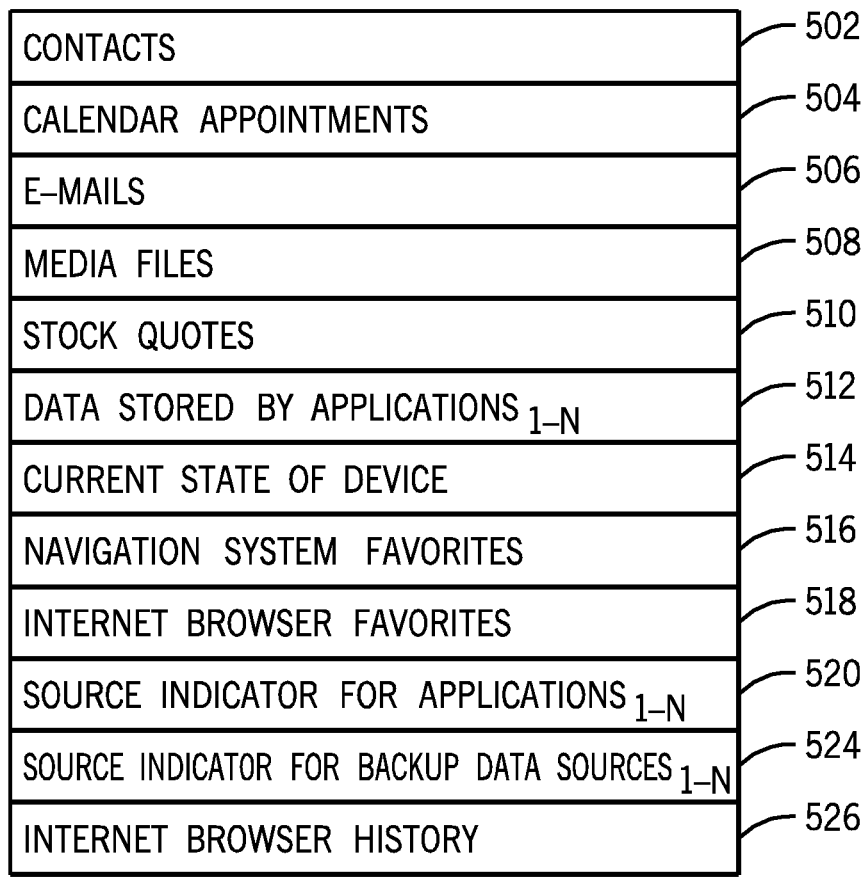
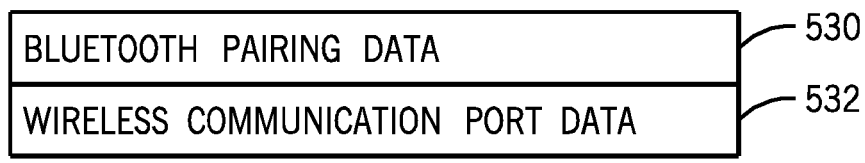
FIG. 5

RESTORING OF DATA TO MOBILE COMPUTING DEVICE

BACKGROUND

Users of mobile computing devices, such as mobile phones, smartphones, and personal digital assistants, store various types of data on the devices. Contact information, calendar appointments, applications and web browser favorites, just to name a few, may all be stored on mobile computing devices. This data is also updated from time to time by a user or other data sources with new data.

Data backup systems allow data from one computing device to be backed up to a secondary memory device, such as a portable hard drive, server computer, digital versatile disc, or other memory device. The backed-up data can then be restored to the same device in the event of data loss or to a new computing device in the case of the user acquiring a replacement or upgraded device. Data loss can occur if the mobile computing device is broken, or if the mobile computing device is stolen or lost.

BRIEF DESCRIPTION OF THE DRAWINGS

FIGS. 1A through 1F illustrate a mobile computing device from various views, according to an exemplary embodiment;

FIG. 5 is a block diagram of first and second databases, according to an exemplary embodiment;

DETAILED DESCRIPTION OF THE EXEMPLARY EMBODIMENTS

Figure 2:
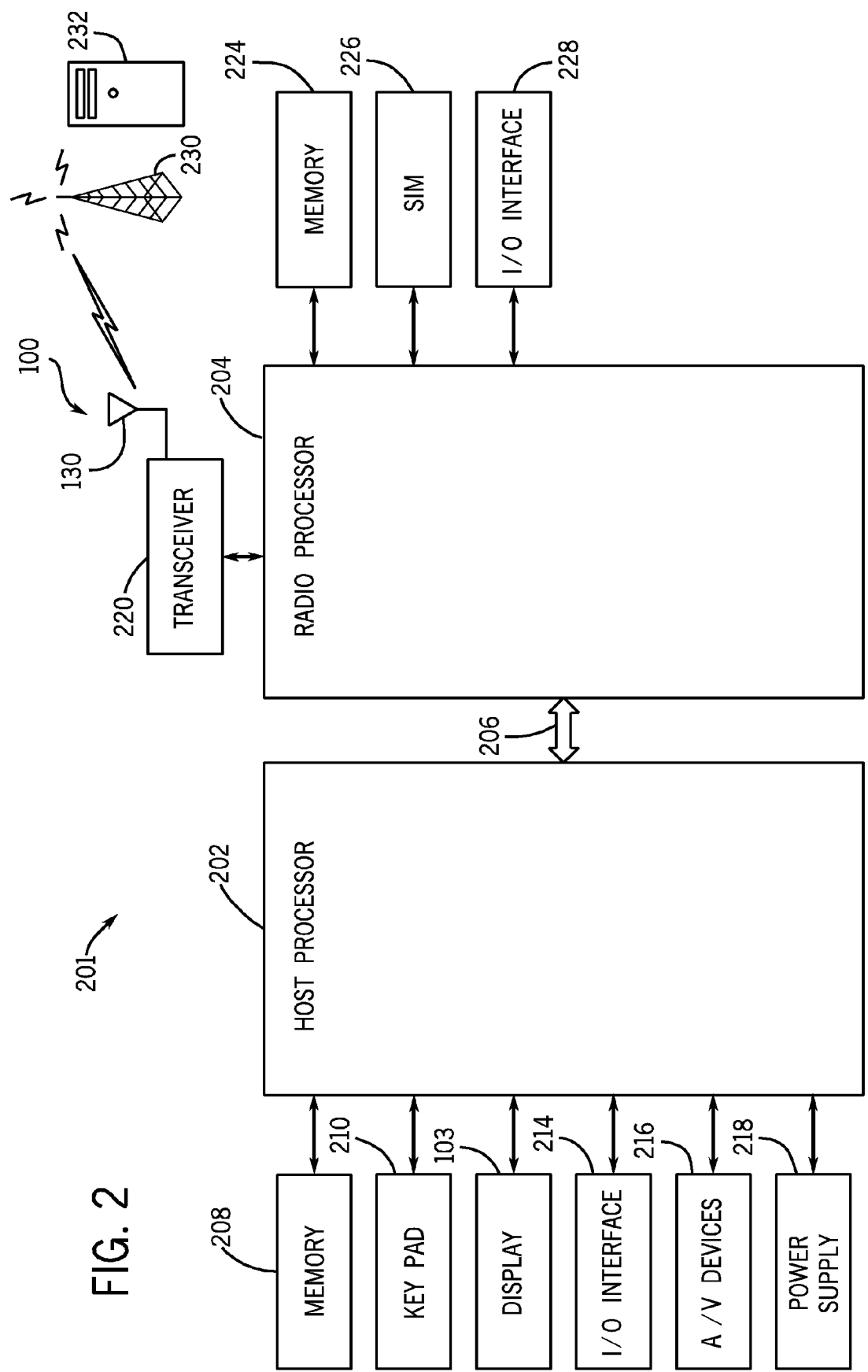
FIG. 2 is a block diagram of the mobile computing device of FIGS. 1A through 1F, according to an exemplary embodiment.

Described herein are various exemplary embodiments of systems and methods for backing up and restoring data from a mobile computing device. Some embodiments may provide better security of a database of personal, user data by having the mobile computing device read the database instead of a remote server reading the database. Some embodiments may provide an orchestration or sequence of restore operations on different sets of data from the same or different backup data sources to bring a user back the user's data and functionality state at the time of a data loss event. Some embodiments simplify the process of restoring data, applications and functionality to a device by freeing a user of having to manually locate and navigate to many different backup data sources to restore the device in piecemeal fashion.

The teachings herein extend to those embodiments that fall within the scope of the appended claims, regardless of whether they accomplish one or more of the above-mentioned exemplary advantages.

Referring to FIGS. 1A through 1F, a mobile computing device 100 is shown from various angles, according to an exemplary embodiment. FIG. 1A is a front view of device 100; FIG. 1B is a rear view of device 100; FIGS. 1C and 1D are side views of device 100; and FIGS. 1E and 1F are top and bottom views of device 100. The device may be any type of communications or computing device (e.g., a cellular phone, other mobile device, digital media player (e.g., audio or audio/video), personal digital assistant, etc.).

Device 100 may be a smart phone, which is a combination mobile telephone and handheld computer having personal digital assistant ("PDA") functionality. The teachings herein can be applied to other mobile computing devices (e.g., a laptop computer) or other electronic devices (e.g., a desktop personal computer, etc.). PDA functionality can comprise one or more of personal information management, database functions, word processing, spreadsheets, voice memo recording, location-based services, device backup and lock, media playing, Internet browsing, etc. and is configured to synchronize personal information or user data (e.g., contacts, e-mail, calendar, notes, to-do list, web browser favorites, etc.) from one or more applications with a computer (e.g., desktop, laptop, server, etc.). Device 100 is further configured to receive and operate additional applications provided to device 100 after manufacture, e.g., via wired or wireless download, Secure Digital card, etc.

Device 100 may be a handheld computer (e.g., a computer small enough to be carried in a typical front pocket found in a pair of pants or other similar pocket), comprising such devices as typical mobile telephones and PDAs, but the term "handheld" and the phrase "configured to be held in a hand during use" excluding typical laptop computers and tablet personal computers ("PCs") for purposes of this disclosure. In alternative embodiments, the teachings herein may extend to laptop computers, tablet PCs, desktop PCS, and other electronic devices. The various input devices and other parts of device 100 as described below may be positioned anywhere on device 100 (e.g., the front side of FIG. 1A, the rear side of FIG. 1B, the sides of FIGS. 1C and 1D, etc.).

Device 100 includes various user input devices. For example, the user input devices may include a send button 104 usable to select options appearing on display 103 and/or send messages, a 5-way navigator 105 usable to navigate through options appearing on display 103, a power/end button 106 usable to select options appearing on display 103 and to turn on display 103, a phone button 107 usable to access a phone application screen, a calendar button 108 usable to access a calendar application screen, a messaging button 109 usable to access a messaging application screen (e.g., e-mail, text, Multimedia Messaging Service (MMS), etc.), an applications button 110 usable to access a screen showing available applications, a thumb keyboard 111 (which includes a phone dial pad 112 usable to dial during a phone application), a volume button 119 usable to adjust the volume of audio output of device 100, a customizable button 120 which a user may customize to perform various functions, a ringer switch 122 usable to switch the device from one mode to another mode (such as switching from a normal ringer mode to a meeting ringer mode), and a touch screen display 103 usable to select control options displayed on display 103.

Device 100 also includes various audio circuits. The audio circuits may include phone speaker 102 usable to listen to information in a normal phone mode, external speaker 116 louder than the phone speaker (e.g. for listening to music, for a speakerphone mode, etc.), headset jack 123 to which a user can attach an external headset which may include a speaker and/or a microphone, and a microphone that can be used to pick up audio information such as the user's end of a conversation during a phone call.

Device 100 may also include a status indicator 101 that can be used to indicate the status of device 100 (such as messages pending, charging, low battery, etc.), a stylus slot 113 for receiving a stylus usable to input data on touch screen display 103, a digital camera 115 usable to capture images, a mirror 114 positioned proximate camera 115 such that a user may view themselves in mirror 114 when taking a picture of themselves using camera 115, a removable battery 118, and a connector 124 which can be used to connect device 100 to either (or both) an external power supply such as a wall outlet or battery charger or an external device such as a personal computer, a global positioning system ("GPS") unit, a display unit, or some other external device.

Device 100 may also include an expansion slot 121 that may be used to receive a memory card and/or a device which communicates data through slot 121, and a Subscriber Identity Module (SIM) card slot 117, located behind battery 118, configured to receive a SIM card or other card that allows the user to access a cellular network.

In various embodiments device 100 may include a housing 140. Housing 140 may be configured to retain or secure a screen in a fixed relationship above a plurality of user input devices in a substantially parallel or same plane. A fixed relationship may exclude a hinged or movable relationship between the screen and plurality of keys in the fixed embodiment, though hinged or movable relationships may be used in other embodiments.

Housing 140 could be any size, shape, and dimension. In some embodiments, housing 140 has a width 152 (shorter dimension) of no more than about 200 mm or no more than about 100 mm. According to some of these embodiments, housing 140 has a width 152 of no more than about 85 mm or no more than about 65 mm. According to some embodiments, housing 140 has a width 152 of at least about 30 mm or at least about 50 mm. According to some of these embodiments, housing 140 has a width 152 of at least about 55 mm.

In some embodiments, housing 140 has a length 154 (longer dimension) of no more than about 200 mm or no more than about 150 mm. According to some of these embodiments, housing 140 has a length 154 of no more than about 135 mm or no more than about 125 mm. According to some embodiments, housing 140 has a length 154 of at least about 70 mm or at least about 100 mm. According to some of these embodiments, housing 140 has a length 154 of at least about 110 mm.

In some embodiments, housing 140 has a thickness 150 (smallest dimension) of no more than about 150 mm or no more than about 50 mm. According to some of these embodiments, housing 140 has a thickness 150 of no more than about 30 mm or no more than about 25 mm. According to some embodiments, housing 140 has a thickness 150 of at least about 10 mm or at least about 15 mm. According to some of these embodiments, housing 140 has a thickness 150 of at least about 50 mm. According to some embodiments, housing 140 has a thickness 150 of 11 mm or less.

In some embodiments, housing 140 has a volume of up to about 2500 cubic centimeters and/or up to about 1500 cubic centimeters. In some of these embodiments, housing 140 has a volume of up to about 1000 cubic centimeters and/or up to about 600 cubic centimeters.

Device 100 may include an antenna 130 system for transmitting and/or receiving radio frequency signals. Each transceiver of device 100 may include individual antennas or may include a common antenna 130. The antenna system may include or be implemented as one or more internal antennas and/or external antennas.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access ("CDMA") cellular radiotelephone communication systems, Global System for Mobile Communications ("GSM") cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service ("GPRS") systems ("GSM/GPRS"), CDMA/1×RTT (1 times Radio Transmission Technology) systems, Enhanced Data Rates for Global Evolution ("EDGE") systems, Evolution Data Only or Evolution Data Optimized ("EV-DO") systems, etc.

Device 100 may be configured to provide voice and/or data communications functionality through wireless access points ("WAPs") in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network ("WLAN") system, wireless metropolitan area network ("WMAN") system, wireless wide area network ("WWAN") system (e.g., a cellular network), and so forth. Examples of suitable wireless network systems offering data communication services may include the Institute of Electrical and Electronics Engineers ("IEEE") 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network ("PAN") system, such as a Bluetooth® system operating in accordance with the Bluetooth Special Interest Group ("SIG") series of protocols.

As shown in the embodiment of FIG. 2, device 100 comprises a processing circuit 201, which may comprise a dual processor architecture, including a host processor 202 and a radio processor 204 (e.g., a base band processor or modem). Host processor 202 and radio processor 204 may be configured to communicate with each other using an interface 206 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth.

Host processor 202 may be configured to execute various computer programs (e.g., software, firmware, or other code) such as application programs and system programs to provide computing and processing operations for device 100. Radio processor 204 may be responsible for performing various voice and data communications operations for device 100 such as transmitting and receiving voice and data information over one or more wireless communications channels. Although embodiments of the dual processor architecture may be described as comprising host processor 202 and radio processor 204 for purposes of illustration, the dual processor architecture of device 100 may comprise one processor, more than two processors, may be implemented as a dual- or multi-core chip with both host processor 202 and radio processor 204 on a single chip, etc. Alternatively, a single processor or multiple processors may perform the functions of host processor 202 and radio processor 204, such as a single, unified processor that handles host and radio functions, or other multiprocessor topologies which do not rely on the concept of a host. Alternatively, processing circuit 201 may comprise any digital and/or analog circuit elements, comprising discrete and/or solid state components, suitable for use with the embodiments disclosed herein.

In various embodiments, host processor 202 may be implemented as a host central processing unit ("CPU") using any suitable processor or logic device, such as a general purpose processor. Host processor 202 may comprise, or be implemented as, a chip multiprocessor ("CMP"), dedicated processor, embedded processor, media processor, input/output ("I/O") processor, co-processor, field programmable gate array ("FPGA"), programmable logic device ("PLD"), or other processing device in alternative embodiments.

Host processor 202 may be configured to provide processing or computing resources to device 100. For example, host processor 202 may be responsible for executing various computer programs such as application programs and system programs to provide computing and processing operations for device 100. Examples of application programs may include, for example, a telephone application, voicemail application, e-mail application, instant message ("IM") application, short message service ("SMS") application, multimedia message service ("MMS") application, web browser application, personal information manager ("PIM") application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface ("GUI") to communicate information between device 100 and a user. The computer programs may be stored as firmware on a memory associated with processor 202, may be loaded by a manufacturer during a process of manufacturing device 100, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system ("OS"), a kernel, device drivers, programming tools, utility programs, software libraries, an application programming interface ("API"), a GUI, and so forth. Device 100 may utilize any suitable OS in accordance with the described embodiments such as a Palm OS®, Palm OS® Cobalt, Microsoft Windows® OS, Microsoft Windows® CE, Microsoft Pocket PC, Microsoft Mobile, Symbian OS™, Embedix OS, any Linux distribution, Binary Run-time Environment for Wireless ("BREW") OS, JavaOS, a Wireless Application Protocol ("WAP") OS, and so forth.

Device 100 may comprise a memory 208 coupled to host processor 202. In various embodiments, memory 208 may be configured to store one or more computer programs to be executed by host processor 202. Memory 208 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory ("RAM"), dynamic RAM ("DRAM"), Double-Data-Rate DRAM ("DDRAM"), synchronous DRAM ("SDRAM)", static RAM ("SRAM"), read-only memory ("ROM"), programmable ROM ("PROM"), erasable programmable ROM ("EPROM"), electrically erasable programmable ROM ("EEPROM"), flash memory (e.g., NOR or NAND flash memory), or any other type of media suitable for storing information.

Although memory 208 is shown as being separate from host processor 202 for purposes of illustration, in various embodiments some portion or the entire memory 208 may be included on the same integrated circuit as host processor 202. Alternatively, some portion or the entire memory 208 may be disposed on an integrated circuit or other medium (e.g., hard disk drive) external to the integrated circuit of host processor 202. In various embodiments, device 100 may comprise a memory port or expansion slot 121 (shown in FIG. 1) to support a multimedia and/or memory card, for example. Processing circuit 201 may use memory port or expansion slot 121 to read and/or write to a removable memory card having memory, for example, to determine whether a memory card is present in port or slot 121, to determine an amount of available memory on the memory card, to store subscribed content or other data or files on the memory card, etc.

Device 100 may comprise a user input device 210 coupled to the host processor 202. User input device 210 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, a keypad and so forth. Examples of such objects are shown in FIG. 1 as 5-way navigator 105, power/end button 106, phone button 107, calendar button 108, messaging button 109, applications button 110, thumb keyboard 111, volume button 119, customizable button 120, and ringer switch 122.

The host processor 202 may be coupled to display 103. Display 103 may comprise any suitable visual interface for displaying content to a user of device 100. For example, display 103 may be implemented by a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

Device 100 may comprise an I/O interface 214 coupled to the host processor 202. I/O interface 214 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a PC, or a remote computer system, such as a computer server. In various implementations, device 100 may be configured to transfer and/or synchronize information with the local computer system, such as personal information management data stored in one or more databases in memory 208.

Host processor 202 may be coupled to various audio/video ("A/V") devices 216 that support A/V capability of device 100. Examples of A/V devices 216 may include, for example, a microphone, one or more speakers, an audio port to connect an audio headset, an audio coder/decoder (codec), an audio player, a digital camera, a video camera, a video codec, a video player, and so forth.

Host processor 202 may be coupled to a power supply 218 configured to supply and manage power to the elements of device 100. In various exemplary embodiments, power supply 218 may be implemented by a rechargeable battery, such as a removable and rechargeable lithium ion battery to provide direct current ("DC") power, and/or an alternating current ("AC") adapter to draw power from a standard AC main power supply.

As mentioned above, radio processor 204 may perform voice and/or data communication operations for device 100. For example, radio processor 204 may be configured to communicate voice information and/or data information over one or more assigned frequency bands of a wireless communication channel. Radio processor 204 may be implemented as a communications processor using any suitable processor or logic device, such as a modem processor or baseband processor. Radio processor 204 may comprise, or be implemented as, a digital signal processor ("DSP"), a media access control ("MAC") processor, or any other type of communications processor in accordance with the described embodiments. Radio processor 204 may be any of a plurality of modems manufactured by Qualcomm, Inc. or other manufacturers.

Device 100 may comprise a transceiver 220 coupled to radio processor 204. Transceiver 220 may comprise one or more transceivers configured to communicate using different types of protocols, communication ranges, operating power requirements, RF sub-bands, information types (e.g., voice or data), use scenarios, applications, and so forth. For example, transceiver 220 may comprise a Wi-Fi transceiver and a cellular or WAN transceiver configured to operate simultaneously.

Transceiver 220 may be implemented using one or more chips as desired for a given implementation. Although transceiver 220 is shown as being separate from and external to radio processor 204 for purposes of illustration, in various embodiments some portion or the entire transceiver 220 may be included on the same integrated circuit as radio processor 204.

Device 100 may comprise an antenna or antenna system 130 for transmitting and/or receiving electrical signals. As shown, antenna system 130 may be coupled to radio processor 204 through transceiver 220. Radio tower 230 and server 232 are shown as examples of potential objects configured to receive a signal from antenna system 130.

Device 100 may comprise a memory 224 coupled to radio processor 204. Memory 224 may be implemented using any type of memory described with reference to memory 208. Although memory 224 is shown as being separate from and external to radio processor 204 for purposes of illustration, in various embodiments some portion or the entire memory 224 may be included on the same integrated circuit as radio processor 204. Further, host processor 202 and radio processor 204 may share a single memory.

Device 100 may comprise a SIM 226 coupled to radio processor 204. SIM 226 may comprise, for example, a removable or non-removable smart card configured to encrypt voice and data transmissions and to store user-specific data for allowing a voice or data communications network to identify and authenticate the user. SIM 126 also may store data such as personal settings specific to the user.

Device 100 may comprise an I/O interface 228 coupled to the radio processor 204. I/O interface 228 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, transceiver 220 and antenna system 130 may comprise GPS receiver or transceiver hardware and one or more associated antennas coupled to radio processor 204 to support position determination.

Host processor 202 may comprise and/or implement at least one location-based service ("LBS") application. In general, the LBS application may comprise any type of client application executed by host processor 202, such as a GPS application configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest ("POI") such as restaurants, hotels, landmarks, and entertainment venues, and other types of LBS services in accordance with the described embodiments.

Radio processor 204 may be configured to generate a position fix by configuring a position engine and requesting a position fix. For example, a position engine interface on radio processor 204 may set configuration parameters that control the position determination process. Examples of configuration parameters may include, without limitation, location determination mode (e.g., standalone, Mobile Station-assisted, Mobile Station-based), actual or estimated number of position fixes (e.g., single position fix, series of position fixes, request position assist data without a position fix), time interval between position fixes, Quality of Service ("QoS") values, optimization parameters (e.g., optimized for speed, accuracy, or payload), Position Determination Entity address (e.g., IP address and port number of LPS or MPC), etc. In one embodiment, the position engine may be implemented as a QUALCOMM® gpsOne® engine.

Figure 3:
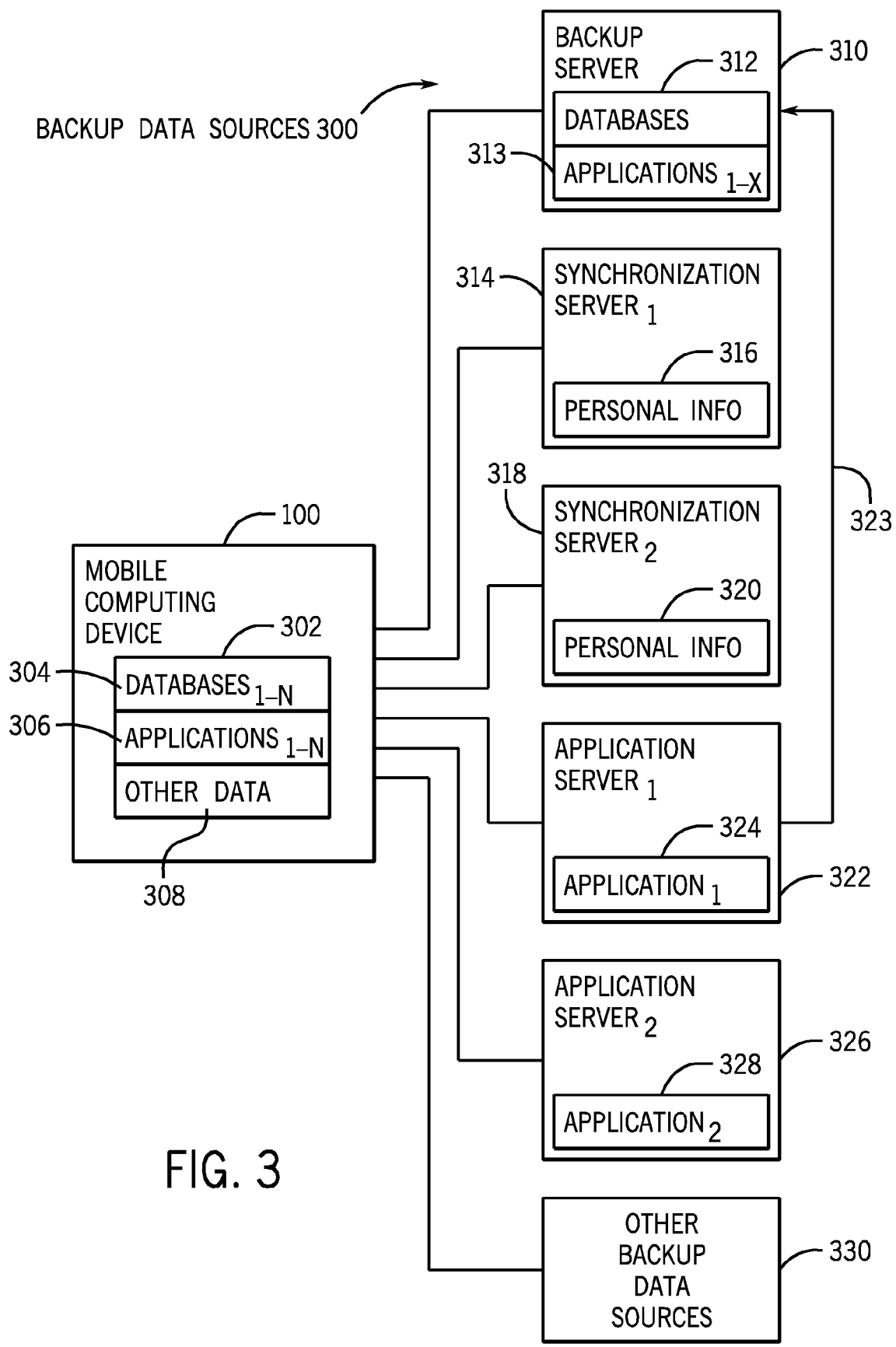
FIG. 3 is a block diagram of a system for backing up and restoring data on a mobile computing device, according to an exemplary embodiment.

Referring now to FIG. 3, a block diagram illustrating a mobile computing device 100 in communication with a plurality of backup data sources 300 is shown. Device 100 may be configured to communicate with data sources 300 over wired or wireless connections, which may include intermediate network connections, such as a cellular network, or other wireless or wired networks described herein. In various embodiments, device 100 may be configured to receive data from one, two or more backup data sources, which data may be stored in memory 302 for use by applications on device 100. Data to be backed up may comprise one or more databases 304, which are files comprising data of one or more types, applications 306, such as any of the applications described herein, and/or other data 308.

A backup server or storage device 310 may be configured to store backed-up data and/or operate a backup operation with device 100 for storage of one or more of databases 304 at a memory 312 and one or more of applications 306 or other data 308 at a memory 313 storing applications. Backup server 310 may be a server operated by or under contract with a manufacturer of device 100, a wireless carrier operating a wireless network associated with device 100, or another party. Backup server 310 may be configured to store backed-up data itself or on one or more different storage devices coupled thereto directly or over a network.

Backup data sources 300 may further comprise one or more synchronization servers 314, 318 for backing up personal information 316, 320, such as contacts, calendar appointments, notes, e-mails, internet browser favorites, and/or any other data personal to a user of device 100 described herein or otherwise. Synchronization servers 314, 318 may be one or more servers associated with an internet service provider providing a service to device 100, such as web e-mail service, text messaging service, instant messaging service, social networking service, or providing access to another computer account for a user of device 100 (e.g., a work computer accessible through a synchronization server such as a Microsoft Exchange synchronization server), any of which may be operable by Google, Inc., Yahoo, Inc., Microsoft, Inc., facebook.com, linkedin.com, America Online Instant Messenger, or other entities or services. Servers 314, 318 may be configured to receive updates or edits to personal information 316, 320 from a user via an internet web portal, store the updates or edits, and send, transmit, download, and/or synchronize the updates or edits with device 100 periodically, using a push, pull, or other model for synchronization of data between devices. Synchronization may relate to a process of mirroring changes over time among multiple data sources, which may occur at a file level, data level, or other level. For example, synchronization may operate according to an Open Mobile Alliance—Data Synchronization (OMA-DS) process, which may use a synchronization markup language (e.g., SyncML), or other markup language. Device 100 may be configured to receive edits to personal information stored in databases 304 and the updates or edits may be synchronized with personal information 316, 320 at one or more of servers 314, 318. Other data besides personal information may be synchronized with servers 314, 318.

Backup data sources 300 may further comprise application servers 322, 326 configured to download applications 324, 328, respectively. Application servers may operate similarly to backup server 310 when downloading applications 313. Application servers 322 and 326 may be operated by parties other than the manufacturer of device 100 for downloading applications compatible with device 100 in response to selection or request by a user of device 100. A user may access application servers 322, 326 through device 100 or through a desktop computer or laptop computer through an internet portal, select an application, provide purchase, billing, and/or account information, and download the application either over the air to device 100 or to a desktop or laptop computer for subsequent synchronization with, installation on, or transfer to device 100. Applications 324, 328 may be any type of application described herein or other types of applications operable on device 100. According to one alternative, application server 322 may be configured to provide device 100 with access to an application through backup server 310 operated by a manufacturer of device 100 via line 323 representing a network connection (e.g., the internet). For example, a manufacturer of device 100 may operate backup server 310 and a third party developer may provide an application accessible through backup server 310 by device 100. Server 310 may further store or provide access to applications after a certification process which authenticates or issues a digital certificate for the application and/or developer of the application, such as that described in U.S. Patent Application No. 61/062,758 titled "Secure Application Signing," filed Jan. 29, 2008, which is incorporated by reference herein in its entirety.

Backup data sources 300 may further comprise any other backup data source 330, such as an external hard drive, a digital versatile disk (DVD), a compact disk—read only memory (CD-ROM), a web-based backup storage server such as the S3 backup storage solution by Amazon.com, a secure digital (SD) card, another digital memory card, or other backup data sources.

Figure 4:
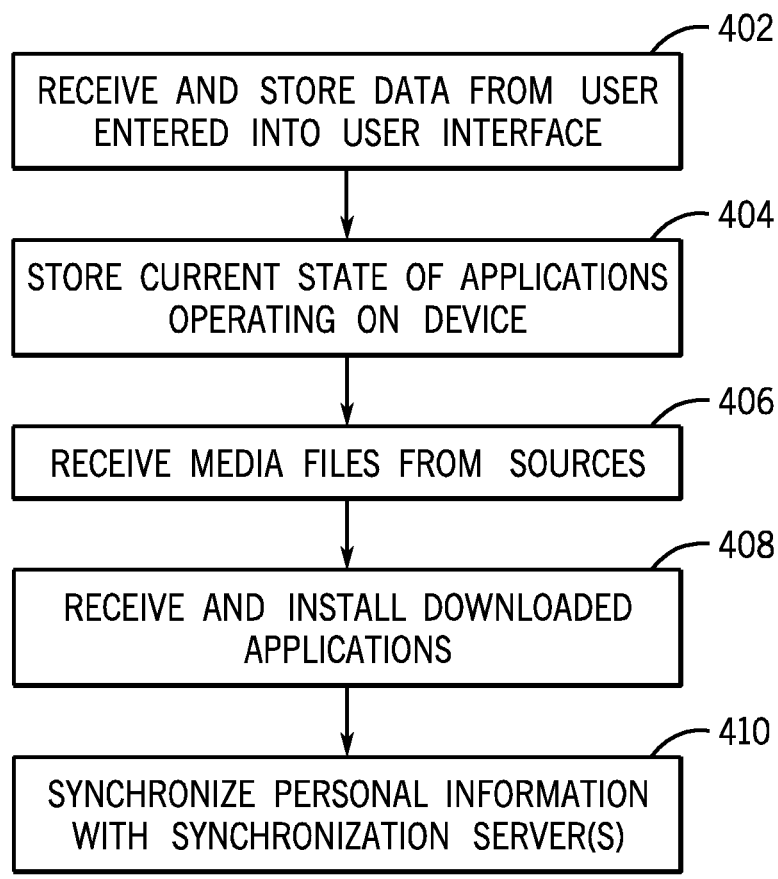
FIG. 4 is a flowchart showing processes for adding data to a mobile computing device, according to an exemplary embodiment.

Referring now to FIG. 4, exemplary steps of adding, editing, updating, deleting, or otherwise modifying data stored on device 100 are illustrated. While shown in a sequence, the steps will occur from time to time in various order depending on user control of device 100. When a user purchases a mobile computing device and first powers on the device, the device either has a pre-stored database file (e.g., created by a relational database, such as a .db3 file, or database or non-database file type). The database file is stored in memory. As shown at step 402, device 100 may be configured to receive and store data from a user entered into the device via a user interface. For example, a user may type in a calendar appointment, new e-mail address, contact phone number, list of to-do items on a tasks application, list of notes on a notes application, etc. Device 100 is configured to update the database file with this new data as the data is being entered. As shown at step 404, device 100 may further be configured to store a current state of one or more applications operating on the device. For example, after a user opens a messaging application, such as an e-mail messaging application, and begins to compose an e-mail, the current application opened, the window within the application which is opened, and the text typed into the draft e-mail may be stored in the database to represent a current state of the device. If multiple applications are active, this data may be stored as part of the state of operation of device 100.

As shown at step 406, device 100 may be configured to receive media files (e.g., video files, audio files, digital still image files, or other files) from any of a plurality of sources, such as a camera built into device 100, a memory card, a wireless or wired connection with a source of audio or video data, etc. Media files may or may not be stored in a database.

As shown in step 408, from time to time, a user may download applications in addition to the applications installed in the device at the time of manufacture from one or more of a plurality of application servers 322, 326, backup server 310 (FIG. 3), or other sources such as an attached desktop or laptop personal computer, memory cards, etc. The applications may be downloaded in response to a user request, such as by navigating to a website or a particular page of a website using a uniform resource locator. A user may use device 100 to download and/or install the applications for use on device 100. A user may be required to choose a username, password, billing data, and/or other data. Device 100 may be configured to encrypt such data and store it in a record in the database of user data on device 100 (or another database on device 100) for use with the data source 300 during a later restore operation.

At step 410, device 100 may be configured to synchronize personal information with one or more synchronization servers 314, 318. According to one exemplary embodiment, personal information or other data which is already stored on synchronization server 314, 318 may not be backed up on backup server 310 at memory 312, in order to save memory on server 310, decrease the time required for backup operation, etc.

Referring now to FIG. 5, the data stored on device 100 can be stored in one or more databases, which may be a single database file, a plurality of files comprising a single database, or other data storage arrangements. In the exemplary embodiment of FIG. 5, a first database (i.e. database1) is configured to store user data and updates thereto for contacts 502, calendar data or appointments 504, e-mails 506, media files 508, stock quotes 510 (received from a source of stock quotes, such as a financial information web page or server), data created by or used by applications operable on the device 512 (e.g., high scores for a gaming application, destination favorites for a location-based services application, a list of pre-selected persons for a "friend finder" application, etc.). A third party developer of an application operable on device 100 may configure the application to store data in database1 or in a separate database, wherein the separate database may or may not get backed-up during a backup operation. The first database may further comprise data representing a current state of device 514, navigation system favorites 516, internet browser favorites 518, and internet browser history data 526 (e.g., representing websites visited in a previous day, month, hour, minute, etc.). The first database may further comprise other data, such as usernames/passwords for access to various websites (which may be stored in encrypted form), etc.

Database1 may further be configured to store source indicators for one or more applications 520 and/or source indicators for one or more backup data sources 524. The source indicator may comprise one or more data representing one or more backup data sources 300 (FIG. 3) and/or the locations of resources associated therewith. A source indicator may be one or more of a resource locator (e.g., a uniform resource locator), a web address or link, an internet protocol (IP) address, a name of a service, a protocol used for communication with a data source, or other source indicators. Database1 may be further configured to store user name and/or password data for data sources 300 to allow device 100 to access backed-up data or applications at sources 300 through a secure connection and/or with reference to a user account. Source indicators may be typed in manually or otherwise provided by a user to device 100, typically at the time a user creates an account with a synchronization server 314, 318, downloads an application from an application server 322, 326, etc.

FIG. 5 also discloses a second database (database2) which, in this embodiment, comprises Bluetooth pairing data, which may comprise Bluetooth IDs of devices having been paired with device 100, the names of the devices, protocol version data, or other data. The second database may further comprise wireless communication port data 532 which may indicate the name, ID, or other information about a device having a communication port, virtual or physical, associated with the device stored in memory of device 100. Other data can be stored in second database, or other databases, such as attachments to e-mails stored in the first database, etc.

The databases shown in FIG. 5 are merely exemplary, and the elements of the data therein may each be stored in its own database, or may be grouped in any arrangement in one or more of databases created by device 100 and updated by device 100 from time to time as a user enters new data, downloads new applications, synchronizes with synchronization sources, configures new wireless configurations, etc.

Figure 6:
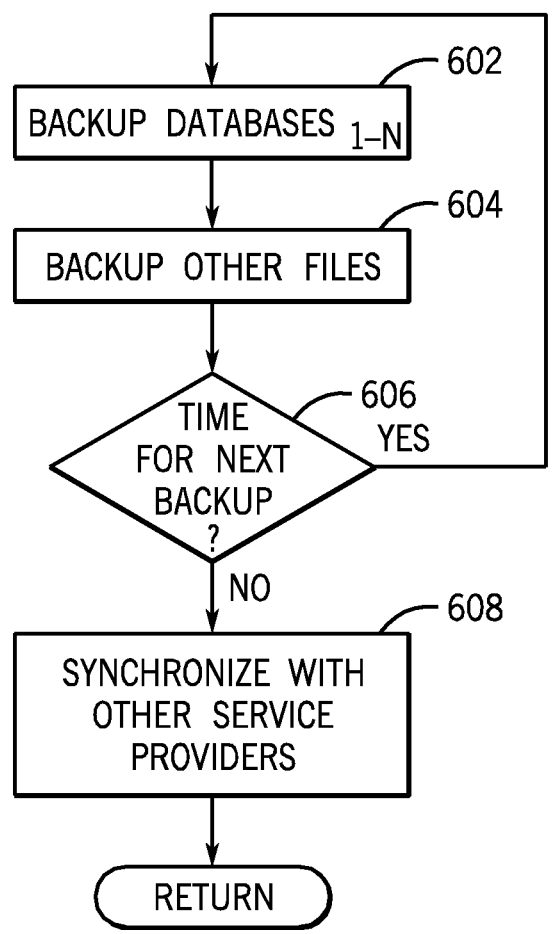
FIG. 6 is a flowchart of a backup method, according to an exemplary embodiment.

Referring now to FIG. 6, exemplary steps in a backup operation operable in device 100 are illustrated. At step 602, one or more databases on device 100 are configured to be backed up to backup server 310.

The steps of FIG. 6 may be operable by one or more modules of a mobile computing device 100 having one or more data files to be backed up. The data file may be any block of data or resource for storing data. In a simple form, the data file may be a sequence of binary digits. The data file may comprise one or more data records or lines, which may be individually different but share a common characteristic. The data file may be a text file, an image file, an executable file, a database file, or other file type.

The data files to be backed up, either as part of the database or as separate files, may comprise personal, user information, or document files such as word processing files, spreadsheet files, portable document format (.pdf) files, etc. The database may comprise any data that can be stored in a database format, such as a relational database, such as a relational database that can be queried using a structured query language (SQL) and/or created using a software library which implements a SQL database engine, such as SQLite. The database filename may comprise a database extension, such as .db3. Any data which is not backed up using one or more of the methods described herein may be backed up using other backup methods in some embodiments.

Device 100 may be configured to store the data file in memory, for example as firmware. Device 100 may further be configured to operate a data backup application configured to perform functions relating to backup of the data file to backup server 310. For example, the data backup application may be configured to receive user inputs indicative of backup preferences, such as which backup method to implement on which data files. Backup methods may comprise any of a number of backup methods, such as a full plus incremental backup in which device 100 is configured to first transmit a full backup of substantially all of the data file or files to the backup storage device, after which subsequent backup operations transmit update data files (e.g., comprising one or more entire records of a data file, a data block of a data file, or other data) indicative of changes in the data file since the immediately prior backup transmission, whether full or incremental. For a restore operation, this method requires downloading the full backup file along with all of the incremental backup files to restore the data file.

The backup method or operation may be a full plus differential backup in which, after a full backup of the data file, subsequent backup operations transmit update data files indicative of changes in the data file since the last full data backup. For a restore operation, this method requires downloading the full backup file along with the last downloaded differential backup file to restore the data file.

Other backup methods may be a simple file copy, or backing up or logging every change to the data file or periodic changes with some frequency (e.g., less than every minute, less than every hour, less than every day, etc.), so that the user can return in a "time machine" fashion to an earlier point in operation of the device. Any backup embodiments may be used which are disclosed in U.S. patent application Ser. No. 12/134,154 entitled "Data Backup for a Mobile Computing Device" filed concurrently herewith, which is herein incorporated by reference in its entirety.

Other user inputs to the backup application may be indicative of which of certain data files or folders of files to backup or to not backup, the time of day and other information regarding the period, frequency, or predetermined time of backups, the desired backup storage device, username and/or password data, and/or other user inputs. For example, the backup application may be configured to backup data once per day, less than three times per day, etc.

As shown at steps 602, 604, device 100 may be configured to transmit databases and/or other files to backup server 310. The data files may comprise substantially all of the data in the data file as stored on device 100, which may be compressed or uncompressed, encrypted or unencrypted, or otherwise processed prior to transmission. Device 100 may then be configured to receive and store changes or updates to the data file, such as data additions, data deletions, data edits, etc., made to data blocks, records or other portions of the data files. The changes or updates may be received from a user typing in the update, from an application making a change based on certain predetermined conditions, by synchronization operations with other computers via wired or wireless communications, or by other methods of receiving updated or changed data. Device 100 is configured to change or update the data file to create a changed or updated data file stored in memory on device 100. Device 100 may further be configured to store an indication that a change or update has occurred to the data file.

At a predetermined time (step 606), for example as set by a user, manufacturer, or wireless carrier associated with device 100, device 100 is configured to determine whether a change or update has occurred since a previous backup transmission (e.g., whether a full backup transmission, update data transmission, etc.) and, if so, to transmit data indicative of the changes made to the data file to server 310. The data indicative of the changes may comprise indications of one or more of data added, data deleted, new data records, etc. since a previous backup of the data file to server 310. The data indicative of the changes may be the data changes in any format, data files comprising the changes, compressed and/or encrypted data indicative of the changes, data converted to another format based on the changes, or other data indicative of the changes. The predetermined time may be periodic, and may be set and/or stored by a scheduler module, which may be part of a backup application operable on device 100. For example, the predetermined time may be midnight, after 10 PM, before 6 AM, etc. Device 100 may be configured to determine whether a change or update has occurred by checking a change indication bit or byte stored in memory (e.g., non-volatile memory), by checking a version number of a data file, etc. If a change has occurred, device 100 is configured to extract the changes or update data (e.g., substantially all of the changes made, a portion of the changes made, etc.) from the data file, compress the update data to form a compressed file of update data, and transmit the update data in the form of a compressed file to server 232 (step 304) using the wireless transceiver. Compression may be done using a ZIP compression, or other compression method. The transmitted data is indicative of changes made to the data file on device 100, and may be in any of a plurality of forms, such as the updated data blocks or records themselves (e.g., only data blocks or records within the data file which have been updated or changed since a previous backup transmission), a compressed form of the updated data blocks or records, encrypted, converted to a database file format, or otherwise processed. The update data transmission may comprise an incremental data file, a differential data file, a delta data file, etc. to indicate changes made to the data file on device 100. The preceding steps may be repeated serially or in parallel for different data files to be backed up (e.g. one or more databases of user data, data files for other applications, etc.).

As shown at step 608, synchronization with synchronization servers 314, 318 may occur on a different time schedule than backup steps 602, 604. For example, synchronization may occur several times a day, while backup occurs once daily. Further, synchronization may occur at the request of server 318 and/or 322, while backup occurs at the request of device 100, or vice-versa.

According to one exemplary embodiment, device 100 may be configured to omit or not backup certain data which is already backed-up at another backup data source. For example, if personal data is synchronized and/or backed-up by synchronization servers 314 or 318, device 100 may be configured to not back up that data as part of the database stored in memory 312 on backup server 310.

Figure 7:
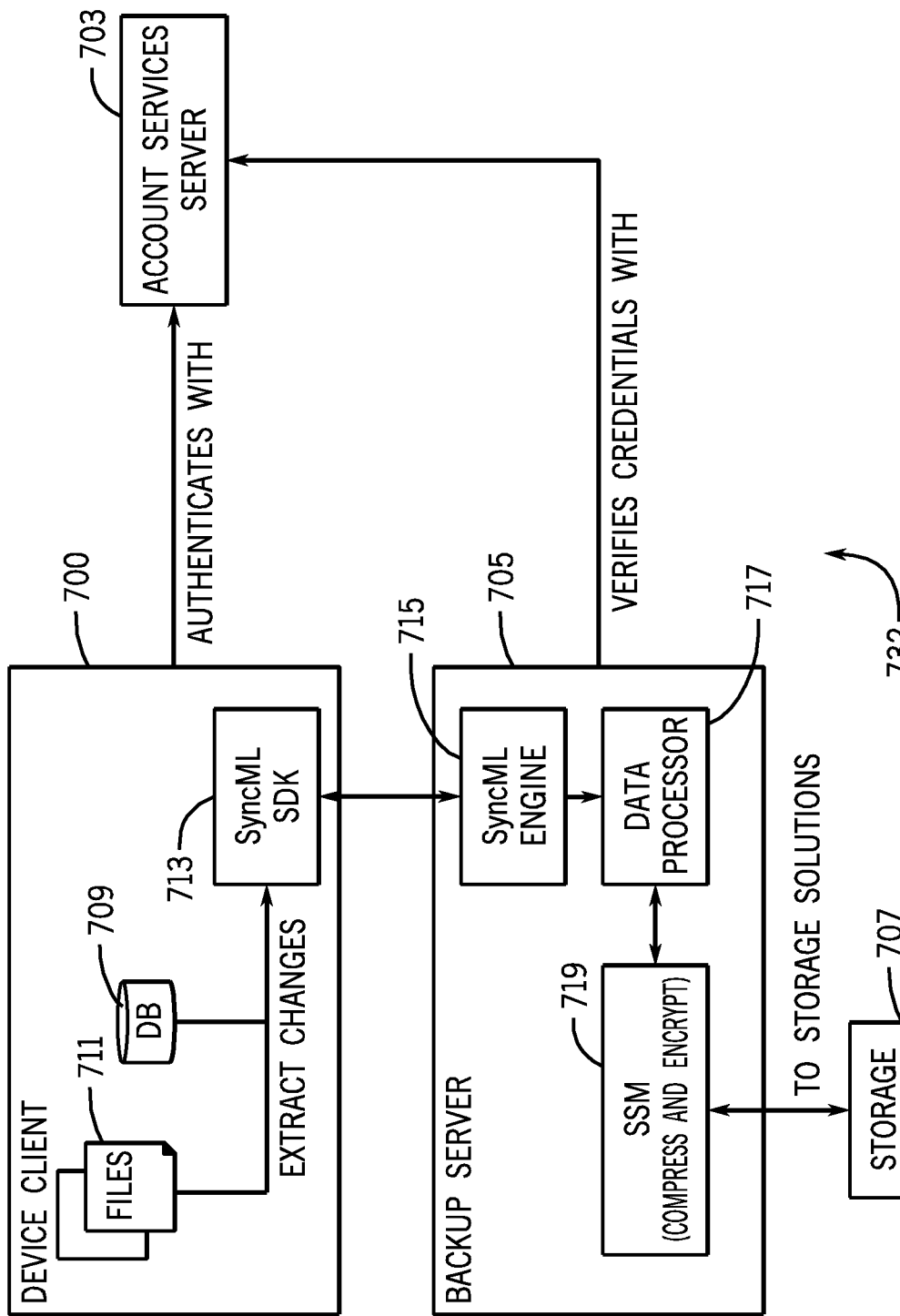
FIG. 7 is a block diagram of a system and method for backup and restore of data, according to an exemplary embodiment.

Referring now to FIG. 7, a block diagram of an exemplary backup and restore system will be described. Portions of the block diagram of FIG. 7 may be implemented using one or more of the methods and devices described herein. The system comprises a device 700 and a server 732 comprising an account services server 703, a backup server 705, and a storage device 707. Servers 703 and 705 and storage device 707 may be separate computing devices or modules of a single computing device, or each may comprise multiple computing devices in various embodiments. Device 700 is configured to store data files, comprising a database 709 of user data and other data files 711.

According to one embodiment which will now be described, a backup of database 709 may comprise storing a copy of database 709 with all updates since the last backup on the server side. However, any type of backup operation may be implemented on the system of FIG. 7 and used with the restore operations described herein. Device 700 is configured to extract changes made to the data files and to provide data indicative of the changes to a communication module 713. Storage device 707 may comprise a local memory on server 705, a separate storage device over a network connection from server 705, a third party online storage service such as Amazon S3 (Simple Storage Service) provided by Amazon Web Services of Amazon.com, Inc., Seattle, Wash., etc., and may be remote from the device 100 (e.g., at a server location, separated from device 100 by a wireless connection, etc.). Storage device 707 may be operated by a manufacturer of device 700 or by another party.

Communication module 713 may be configured to communicate with a communication module 715 on server 732 (and/or a communication module on server 703) using any of the communication methods described herein (e.g., cellular, IEEE 802.11x, etc.). Modules 713 and 715 may be synchronization modules configured to facilitate synchronization of data between device 700 and server 705. More specifically, modules 713 and 715 may be configured to communicate using a markup language, such as a SyncML (Synchronization Markup Language) standard. Modules 713 and 715 may be configured to synchronize data from applications (e.g., contacts, calendar, e-mail, text messages, push e-mail, etc.) and may further be used for backup and/or restore operations such as those described herein. Advantageously, modules 713 and 715 may be configured, in response to an interruption in a synchronization of a file, to cease synchronization and/or resume synchronization without starting at the beginning of the file being synchronized. For example, synchronization after an interruption may resume substantially at the point in the file where the interruption occurred. The interruption may be caused by a loss of a communication signal, another process (e.g., a phone call) using the communication signal used for synchronization, etc.

Module 713 may be configured to communicate with servers 703 and 705 using an OMA-DM (Open Mobile Alliance for Device Management) or OMA-DS (Open Mobil Alliance for Device Synchronization) communication or synchronization protocol. OMA-DM and OMA-DS protocols may use a markup language, such as XML (Extensible Markup Language), or a SyncML markup language. These protocols may use any data transport layer, such as a wired layer (e.g., USB, RS-232, etc.) or wireless layer (GSM, CDMA, IrDA, Bluetooth, etc.), and may be implemented over any of a wireless application protocol (WAP), HTTP, Object Exchange (OBEX), or other transports. These protocols may use a request-response message exchange method in which a requester sends a request message to a replier system which receives and replies to the request with a response message. These protocols may use authentication and/or security on server side 705 and/or device side 700 (e.g., which may be a mutual authentication) to identify the senders of each message. These protocols may initiate a communication session from a server, which may occur asynchronously, and may use WAP push, SMS, or other messaging systems. These protocols may initiate a communication with a notification or alert message from server 705 to device 700 (or vice-versa) to notify the other of a desire to establish a communication session. These protocols may be configured to enable communications among more than two devices. While this exemplary embodiment is described with reference to OMA-DM and OMA-DS protocols, other protocols (e.g., using a Transmission Control Protocol (TCP) or other protocol) having one or more of the characteristics described above or other characteristics may be used.

According to one exemplary embodiment, device 700 may be configured as a master to one or more devices on the server side, such as backup server 705. Module 713 and module 715 may be configured in a manner that module 713 wins (e.g., a "client win" configuration) any discrepancy in synchronized data between device 700 and module 715. According to another exemplary embodiment, communications described herein may transfer binary data using an extension of an OMA protocol that generically supports any data type rather than an extension configured to handle a certain specific data type.

In response to a request message from device 700 to server 703, server 703 is configured to authenticate the request message and identify a user account associated with device 700 before changing the data file stored on storage device 707. Server 703 may be configured to establish an account, receive a user request for a backup service, process payment, etc. Server 703 may further be configured to communicate with backup server 705.

During a backup operation, module 713 is configured at the predetermined period (e.g., once per day, etc.) to query database 709 and/or files 711 to determine whether any changes have been made to the data stored therein. If data has been changed, module 713 is configured to establish a communication session with module 715 as described above. Module 713 is then configured to extract the changes from database 709 and/or files 711, compress the complete file (if a first or full backup) or data indicative of changes (if a subsequent update backup operation), and transmit the data files and/or data indicative of changes to the data files to module 715.

Module 715, under control of a processor or data processor 717, is configured to receive the backup data from module 713 and identify any full data files corresponding to received data indicative of updates. Any corresponding full data file is retrieved from storage device 707 and decrypted and decompressed at a storage services module 719 so that it may be edited. Data processor 717 is then configured to receive the data indicative of changes from module 715, decompress the data, and apply the data indicative of changes to the full data file. The updated or changed data file is then compressed and encrypted by module 719 and returned to storage device 707.

After updating, module 715 is configured to send a message to module 713 indicating that updating has been completed. In response to this or based on other circumstances, device 700 is configured to mark or identify a point in time indicating when or which data has been backed up and/or applied to the data file stored on the server side (e.g., in storage device 707). At the next predetermined backup time, device 700 is configured to read the mark or identification and determine which changes to process for the next backup operation based on the mark or identification.

As mentioned, during a subsequent restore operation of the data file to the device or a different mobile computing device, server 705 may be configured to download the updated data file, without the need to also download incremental or differential data files, because the updated data file already represents any data updates from backup transmissions. Any of a plurality of restore operations may be used. For example, server 705 may be configured to receive a request to download data to device 700 or to a second mobile computing device (for example, if a user replaces their device with a new device, if a user uses two or more devices, etc.). In response to the request, server 705 may be configured to transmit the changed data file to device 700 or the second mobile computing device. According to one embodiment, the transmission is of the changed data file (e.g., the substantially full or complete updated or changed data file) without sending individual incremental data files.

Figure 9:
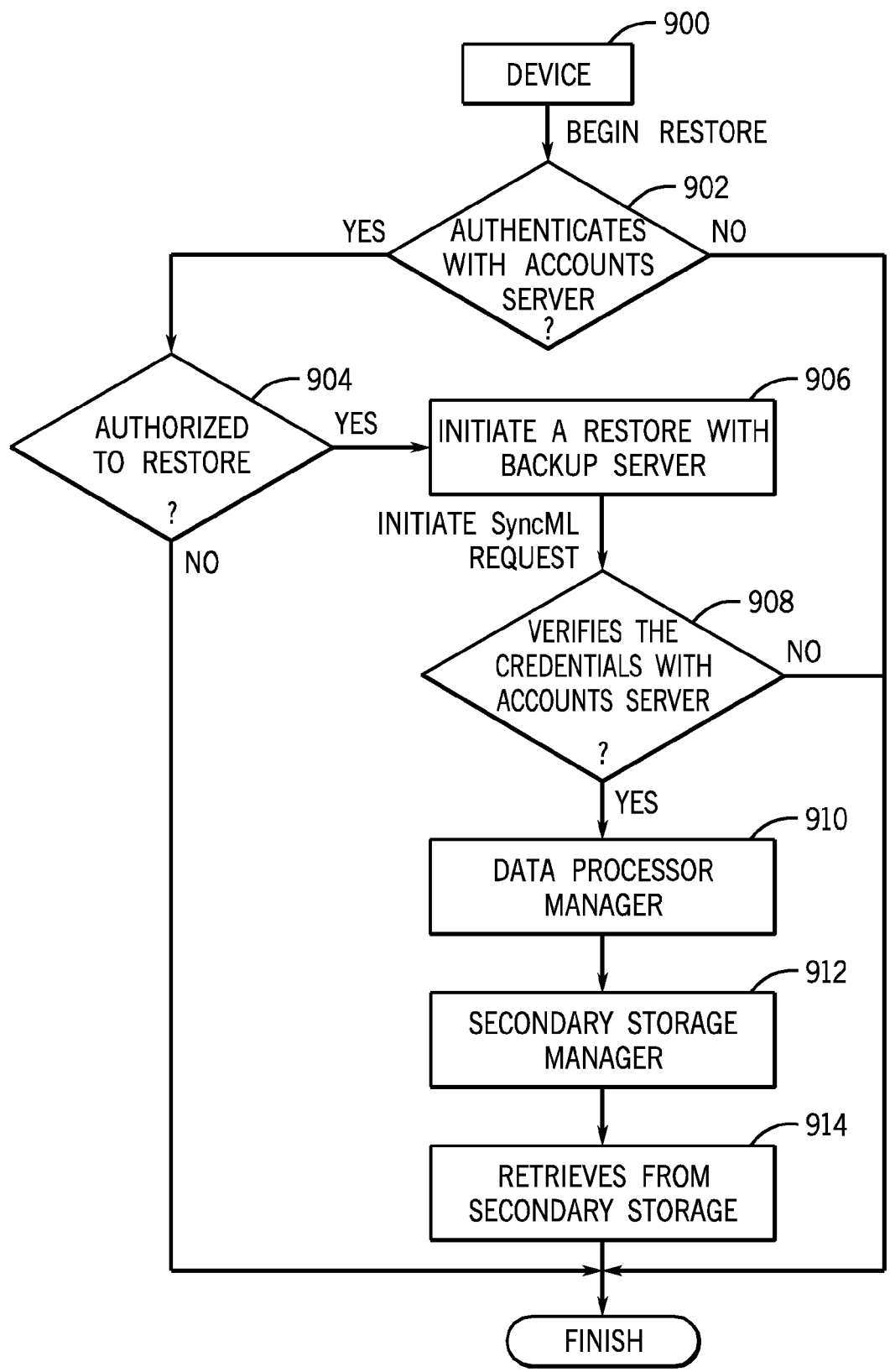
FIG. 9 is a flowchart of operations relating to a restore operation, according to an exemplary embodiment.

Referring now FIG. 9, operations relating to a restore operation are shown. At step 900, device 700 is configured to send a request to begin a restore operation. At step 902, server 702 is configured to authenticate the sender or request message of device 700 using any type of authentication method (e.g., shared secret, electronic signature, crypt key, etc.). If authenticated, the method proceeds to step 904 at which server 703 is configured to determine whether device 700 is authorized to perform a restore operation. For example, server 702 determines whether device 700 has a backup and/or restore service associated with an account for device 700 (e.g., a user of device 700 has purchased or has as a feature of its account a backup and/or restore service. If authorized to restore, at step 906, server 703 is configured to communicate to device 700 and/or server 705 that a restore operation is authorized, in which case a restore operation is initiated by way of modules 713 and 715.

At step 908, server 705 is configured to receive credentials (e.g., one or more of a username, password, key, identifier, etc.) for or from device 700 (via modules 713, 715 or via server 703) and to send a request to server 703 to verify the credentials. If server 703 verifies the credentials, steps 910 and 912 proceed with data processor 717 and a storage manager (operable on server 705 and/or storage device 707), respectively, to carry out the requested restore operation. At step 914, backup data is retrieved from storage device 707 and restored to device 100 via modules 713 and 715, which can occur as described below with reference to FIG. 8.

Figure 8:
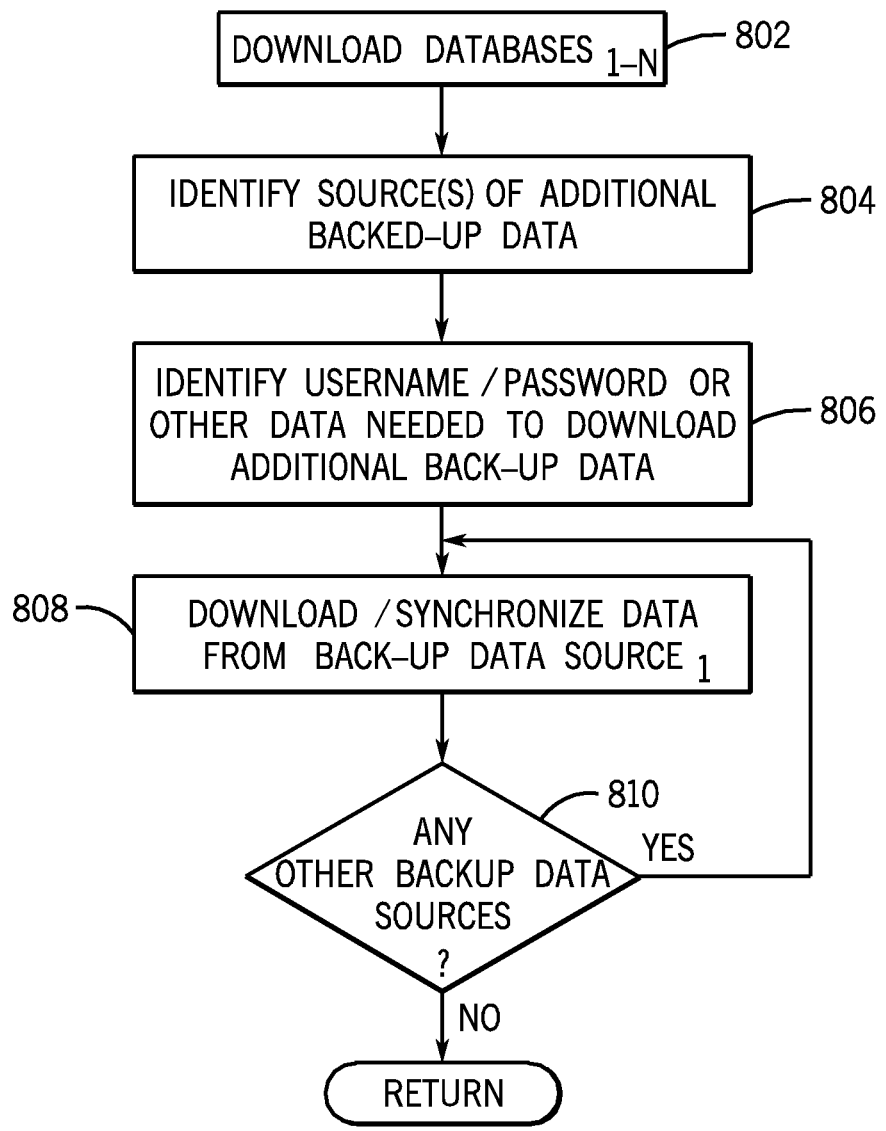
FIG. 8 is a flowchart of a restore operation, according to an exemplary embodiment.

Referring now to FIG. 8, an exemplary restore process will be described. A user may have purchased a new device or has lost data on device 100. For example, a user may have lost device 100 and requested through backup server 310 that server 310 send a message to device 100 to delete all data, one or more files of data, such as a database of personal data, or other data on device 100 (e.g., in a "data wipe" or "kill pill"-type operation), to prevent another person from accessing the data who finds the device.

In any event, device 100 may be configured to orchestrate a progression of restoring data of different types from one or more of backup data sources 300, which may occur in any order. At a step 802, first data comprising one or more of databases 304 are downloaded or received from backup server 310 and stored in memory on device 100. The storing may comprise overwriting or swapping an existing database of user data on device 100 if a corresponding database already exists. For example, upon first power-up of a device or after a reset (e.g., hard reset, removing battery power, etc.) device 100 will create a user data database for saving personal information from personal information management applications. At step 802, the downloading of a user data database from backup server 310 may overwrite or replace the previously-created user data database.

At this point, device 100 may be configured to allow applications and the user to use the user data database or other databases downloaded at step 802, in which case further restore steps may operate in the background while the user is allowed to use the applications and the databases. Thus, the processing circuit of device 100 may be configured to receive a user request for backed-up data in a first group or category (e.g., a user data database) which has been downloaded by providing some or all of the first backed-up data from the memory to the user, to a memory device, or otherwise for use by an application or a device in communication with device 100 before a second backed-up data has been downloaded and/or installed. The second backed-up data may be additional personal information, data synchronized with a synchronization server 314, 318, an application and/or data associated with an application downloaded from application server 322, 326 and/or backup server 310, or data from other backup data sources 330. The backed-up data in the first and second categories (which may or may not be different types of data) described here may be from the same remote source, such as backup server 310, or from different remote sources. Even in a restore mode or restore operation, device 100 may be configured to provide access to data already restored to device 100 to allow at least some functionality of the device while the restore process continues.

At step 804, device 100 is configured to identify a source of second data which has been backed up for restoring. An identifier of a source of the second data to be restored may be received or downloaded from backup server 310, which may or may not be part of the database of the first data which was downloaded. In one exemplary embodiment, device 100 is configured to read source indicator data in the downloaded database to identify a source of second data for download. For example, the database may have a uniform resource locator for an application to be downloaded from application server 322, 326, or may comprise data about an account a user of device 100 has for synchronization server 314, 318 for downloading of contacts, e-mails, etc. At step 804, the source may be identified without requiring user input, such as by reading a source from a database, reading a source from a memory local to device 100 which was not deleted or lost during a loss-of-data situation, reading from a memory card, or otherwise identifying without requiring a user to type a URL into device 100. Device 100 may be configured to perform one or more of these steps automatically or without user input: identify a source of second data, send a request to a data source 300 for the data based on the identified source indicator, download such requested data, save and/or install the downloaded data on device 100, select a next data for download, etc. Alternatively, one or more of the foregoing steps may be done with one or more forms of user input, such as a pop-up seeking user OK or approval, a period of delay after which the process will proceed without user input, a prompt to enter a username and/or password, a prompt to receive a user selection of an order in which data is to be restored, etc.

At step 806, device 100 may be configured to identify a username, password, or other data or metadata needed to download additional backup data (one or more of which may be stored in encrypted form in the database). In a case where backup server 310 stores or provides access to all of the applications 313 stored on device 100, one password may be all that is required for device 100 to restore (by downloading and installing) all of the applications 306 which previously operated on device 100 at the time of the last backup operation. In a case where applications are stored at more than one server 310, 318, 322, username and/or password data may be stored in the downloaded database for each server or user account so that device 100 may access those applications (which may again be done without requiring user input) during a restore operation.

At step 808, device 100 is configured to send a request for the second data based on the source indicator, preferably through a wireless communication. Device 100 is configured to download and/or synchronize additional data from a first of the additional backup sources 300, then subsequent sources 300 as indicated by step 810, until all backed-up data is restored. Receiving backed-up data from sources 300 may occur serially as shown in FIG. 8 or may occur in parallel, in which data from a plurality of sources 300 is downloaded simultaneously or interlaced with each other in a communication session. As mentioned, device 100 may be configured to provide the user with access to any restored data or application even while additional data or applications (or data used by applications) are restored "in the background", which access may be provided for use with the application prior to or during downloading the additional data or applications from backup data sources 300. If an application is downloaded from application server 322, 326, data associated with that application (e.g., user data, library files, etc.) may also be downloaded and restored to device 100.

Backed-up data may be downloaded in any order. In one example, a database of user data such as that shown in FIG. 5 as database1 is downloaded and restored first. In this example, the device or portions thereof may not be useable until the database has been downloaded and restored, which may take several minutes depending on the size of the database, wireless speed and bandwidth, etc. Next, any user files not backed-up as part of database1 are downloaded and restored (e.g., database2, ringtones, audio files, word processing files, spreadsheet files, .pdf files, etc.). Processing circuit 201 of device 100 is configured to read from database1 source indicator data for applications which previously operated on device 100 (or a device to be replaced by device 100). Circuit 201 is then configured to download and install those applications. Updates to those applications may also be checked for by device 100 or the data source 300 and downloaded and installed along with the applications. Next, processing circuit 301 is configured to read from database1 source indicator data for any synchronization data sources previously used by device 100 (or a device to be replaced by device 100) and to launch or begin one or more synchronization processes to receive data (e.g., personal information such as contacts, calendar appointments, etc.) from synchronization servers 314, 318.

Device 100 may be configured to display indications to a user at one or more points during a restore operation. For example, device 100 may display an indication that a restore operation had begun or is in process, which may be displayed at a bottom or top portion of the screen covering less than 20% or less than 10% of the screen area. Device 100 may provide an indication of a status of a file being downloaded (e.g., "application X requested," "application X downloading," "installing application X," etc.). Device 100 may provide an indication of all source indicators found in a restored database (e.g., "found application X, application Y and synchronization data sources A and B and beginning restore operation.")

An application download may comprise downloading a thin client or other local data or reference to an application operable on a remote server. Thus, applications do not need to be fully-downloaded applications on device 100 in order to be backed-up.

While the mobile computing device reads a database of user data to identify additional backup sources in one exemplary embodiment described herein, a server computer may alternatively perform this function and then contact other backup data sources for downloading data and orchestrating or carrying out a backup operation.

According to one exemplary embodiment, a computer program may be stored as firmware or other code on the mobile computing device to initiate and/or conduct a restore operation in any of the embodiments described herein using the processing circuit of the device.

According to one exemplary embodiment, the mobile computing device operates to restore data from various different sources, whether or not the sources are associated with a manufacturer of the mobile computing device, to free the user from having to manually go to various different places and bring down the data. In alternative embodiments, some user interaction may be used, for example to download data from sources not known to device 100, requiring additional security data not stored in device 100, etc.

The embodiments disclosed herein have been described with reference to block diagrams and flow diagrams. Each block may represent one or more computer programs (e.g., software, firmware, etc.) and/or the hardware or processing circuitry on which the computer programs operate (e.g., microprocessors, microcontrollers, applications-specific integrated circuits, programmable logic, programmable gate array, etc.). Use of the term module herein may refer to either computer program and/or circuit components operating the computer program to carry out the functions described herein. Modules may interface with other modules at a hardware and/or computer program level, and may operate at and/or interface with other modules at any applicable computer program level specified in the Open Systems Interconnection (OSI) model, such as application layer, presentation layer, session layer, transport layer, network layer, data link, physical layer, etc. Modules may be represented by a block, multiple blocks or portions of blocks in the various figures herein.

While the exemplary embodiments illustrated in the FIGS, and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device comprising:
   a wireless transceiver to communicate with a remote server;
   a memory; and
   a processing circuit coupled to the wireless transceiver, the processing circuit to perform a restore operation by:
   a) receiving first data from the remote server, the first data including user account information for accessing second data, the second data comprising at least a downloadable application;
   b) identifying, from the received first data, one or more source indicators for the second data from the remote server, the one or more source indicators comprising a resource locator, wherein the first data and second data represent data previously stored in the memory of the mobile computing device or in a memory of another mobile computing device;
   c) identifying, from the received first data, user account information to receive the second data from one or more sources corresponding to the one or more source indicators, the user account information including at least one of a user name or password used to have access to the one or more sources;
   d) providing a prompt, on a display of the mobile computing device, to receive a user selection specifying an order in which the second data is to be downloaded; and
   e) sending one or more requests, according to the user selection, for the second data using the one or more source indicators, the one or more requests being sent via the wireless transceiver in order to download the second data using the identified user account information;
   wherein the processing circuit enables a user to access the first data for use with an application on the mobile computing device prior to or during downloading the second data.

2. The device of claim 1, wherein the first data and the one or more source indicators are received in one or more database files.

3. The device of claim 1, wherein the processing circuit downloads the second data from a second remote server different than the remote server.

4. The device of claim 3, wherein the second data comprises at least one of contact data or calendar data, and wherein the contact data or calendar data is downloaded from the second remote server.

5. The device of claim 4, wherein the processing circuit downloads the second data using a synchronization operation.

6. The mobile computing device of claim 3, wherein the second remote server is an application server storing a plurality of applications.

7. The device of claim 1, further comprising a display, and wherein the processing circuit, during the restore operation, displays a notification relating to the downloading of the second data.

8. The mobile computing device of claim 1, wherein the resource locator comprises one of a uniform resource locator (URL), an internet protocol address, or a name of a service.

9. A method of downloading data on a mobile computing device, comprising:
   downloading a database from a remote server via a wireless transceiver during a restore operation, wherein the database comprises first data previously stored on at least one of the mobile computing device or a second mobile computing device, the first data including user account information for accessing second data, the second data comprising at least a downloadable application;
   identifying, from the downloaded database, one or more source indicators for the second data without requiring user input, the one or more source indicators comprising a resource locator, wherein the second data represents data that was previously stored on the at least one of the mobile computing device or the second mobile computing device;

identifying, from the downloaded database, user account information to receive the second data from one or more sources corresponding to the one or more source indicators, the user account information including at least one of a user name or password used to have access to the one or more sources;

providing a prompt, on a display of the mobile computing device, to receive a user selection specifying an order in which the second data is to be downloaded; and using the one or more source indicators and the identified user account information, downloading the second data during the restore operation from the one or more sources according to the user selection, wherein a user of the mobile computing device is provided access to the first data for use with an application on the mobile computing device prior to or during downloading the second data.

10. The method of claim 9, wherein the second data is downloaded from a second remote server different than the remote server.

11. The method of claim 10, wherein the second data comprises at least one of contact data or calendar data, and wherein the contact data or calendar data is downloaded from the second remote server.

12. The method of claim 11, wherein downloading the second data comprises synchronizing the second data with data on the mobile computing device.

13. The method of claim 10, wherein the second remote server is an application server storing a plurality of applications.

14. The method of claim 9, further comprising displaying, on a display of the mobile computing device, a notification relating to the downloading of the second data.

15. The method of claim 9, wherein the resource locator comprises one of a uniform resource locator (URL), an internet protocol address, or a name of a service.

16. A non-transitory computer-readable medium storing instructions that, when executed by one or more processors, cause the one or more processors to:

download a database from a remote server via a wireless transceiver during a restore operation, wherein the database comprises first data previously stored on at least one of a mobile computing device or a second mobile computing device of a user, the first data including user account information for accessing second data, the second data comprising at least a downloadable application;

identify, from the downloaded database, one or more source indicators for the second data without requiring user input, the one or more source indicators comprising a resource locator, wherein the second data represents data that was previously stored on the at least one of the mobile computing device or the second mobile computing device;

identify, from the downloaded database, user account information to receive the second data from one or more sources corresponding to the one or more source indicators, the user account information including at least one of a user name or password used to have access to the one or more sources;

provide a prompt, on a display of the mobile computing device, to receive a user selection specifying an order in which the second data is to be downloaded; and use the one or more source indicators and the identified user account information to download the second data during the restore operation from the one or more sources according to the user selection, wherein a user of the mobile computing device is provided access to the first data for use with an application on the mobile computing device prior to or during downloading the second data.

17. The non-transitory computer-readable medium of claim 16, wherein the second data is downloaded from a second remote server different than the remote server.

18. The non-transitory computer-readable medium of claim 17, wherein the second remote server is an application server storing a plurality of applications.

19. The non-transitory computer-readable medium of claim 16, wherein the instructions cause the one or more processors to display, on a display of the mobile computing device, a notification relating to the downloading of the second data.

20. The non-transitory computer-readable medium of claim 16, wherein the resource locator comprises one of a uniform resource locator (URL), an internet protocol address, or a name of a service.

* * * * *